United States Patent [19]

Swinkels et al.

[11] 3,964,901
[45] June 22, 1976

[54] PRODUCTION OF COPPER AND SULFUR FROM COPPER-IRON SULFIDES

[75] Inventors: Godefridus Maria Swinkels, Rossland; Robert Arthur Furber, Edmonton; Edward Francis Godfrey Milner, Warfield; Roman Michael Genik-Sas-Berezowsky, Edmonton; Charles Ray Kirby, Rossland, all of Canada

[73] Assignees: Sherritt Gordon Mines Limited, Toronto; Cominco Ltd., Vancouver, both of Canada

[22] Filed: Oct. 19, 1973

[21] Appl. No.: 408,132

[52] U.S. Cl. .................................... 75/108; 75/6; 75/109; 75/117; 75/118 R; 204/108; 423/22; 423/27; 423/36; 423/37; 423/47; 423/55; 423/87; 423/95; 423/98; 423/101; 423/109; 423/140; 423/143; 423/145; 423/150; 423/154; 423/508; 423/522; 423/574 R; 423/567 R

[51] Int. Cl.² ................ C22B 1/11; C22B 15/12; C22B 61/00; C01B 17/06

[58] Field of Search .............. 423/47, 48, 567, 153, 423/154, 522, 150, 109, 101, 27, 150, 576, 578 S, 87, 55, 95, 98, 140, 145, 508, 22; 75/117, 119, 108, 120, 121, 109, 6, 118; 204/108

[56] References Cited
UNITED STATES PATENTS

| | | | |
|---|---|---|---|
| 2,653,905 | 9/1953 | Aanerud | 75/117 X |
| 2,805,938 | 9/1957 | McGauley | 423/567 X |
| 2,878,102 | 3/1959 | Sternfels | 423/47 X |
| 3,053,651 | 9/1962 | McGauley | 423/154 X |
| 3,529,957 | 9/1970 | Kunda et al. | 75/117 |
| 3,793,432 | 2/1974 | Weston | 423/143 |
| 3,803,288 | 4/1974 | Kudryk et al. | 75/111 X |

Primary Examiner—Herbert T. Carter
Assistant Examiner—Brian E. Hearn
Attorney, Agent, or Firm—Arne I. Fors; Frank I. Piper; James T. Wilbur

[57] ABSTRACT

A hydrometallurgical process for treating iron containing metal sulfides for rendering iron and non-ferrous metal values active and amenable for selective extraction and separate recovery. Sulfur values can be controllably produced as elemental sulfur or as sulfuric acid to supply acid requirements of the process, while substantially obviating the discharge of sulfur-containing gases to the atmosphere. Ores and concentrates of the sulfides are thermally activated by sequentially heating and reducing said sulfides in a countercurrent flow of heating and reducing gases respectively in a reactor whereby the reaction products of the reducing gas and sulfides, together with liberated labile sulfur, are controllably combusted with oxygen to satisfy heat requirements of the thermal activation process and to convert sulfur values to $SO_2$ gas. The activated sulfides are subjected to an acid leach in aqueous sulfuric acid for production of ferrous sulfate and evolution of $H_2S$ gas which are separated from the solid sulfide residue containing concentrated non-ferrous metal values. The ferrous sulfate is oxidized and hydrolysed to precipitate the iron, which is removed from the system, and to regenerate sulfuric acid. At least a portion of the $SO_2$ gas from said heating step and at least a portion of the $H_2S$ from the acid leach are converted to sulfuric acid to satisfy the acid requirements of the process, and remaining $SO_2$ is combined and catalytically reacted with remaining $H_2S$ to produce elemental sulfur.

The solids residue from the acid leach is subsequently subjected to further treatment for recovery of metal values.

28 Claims, 1 Drawing Figure

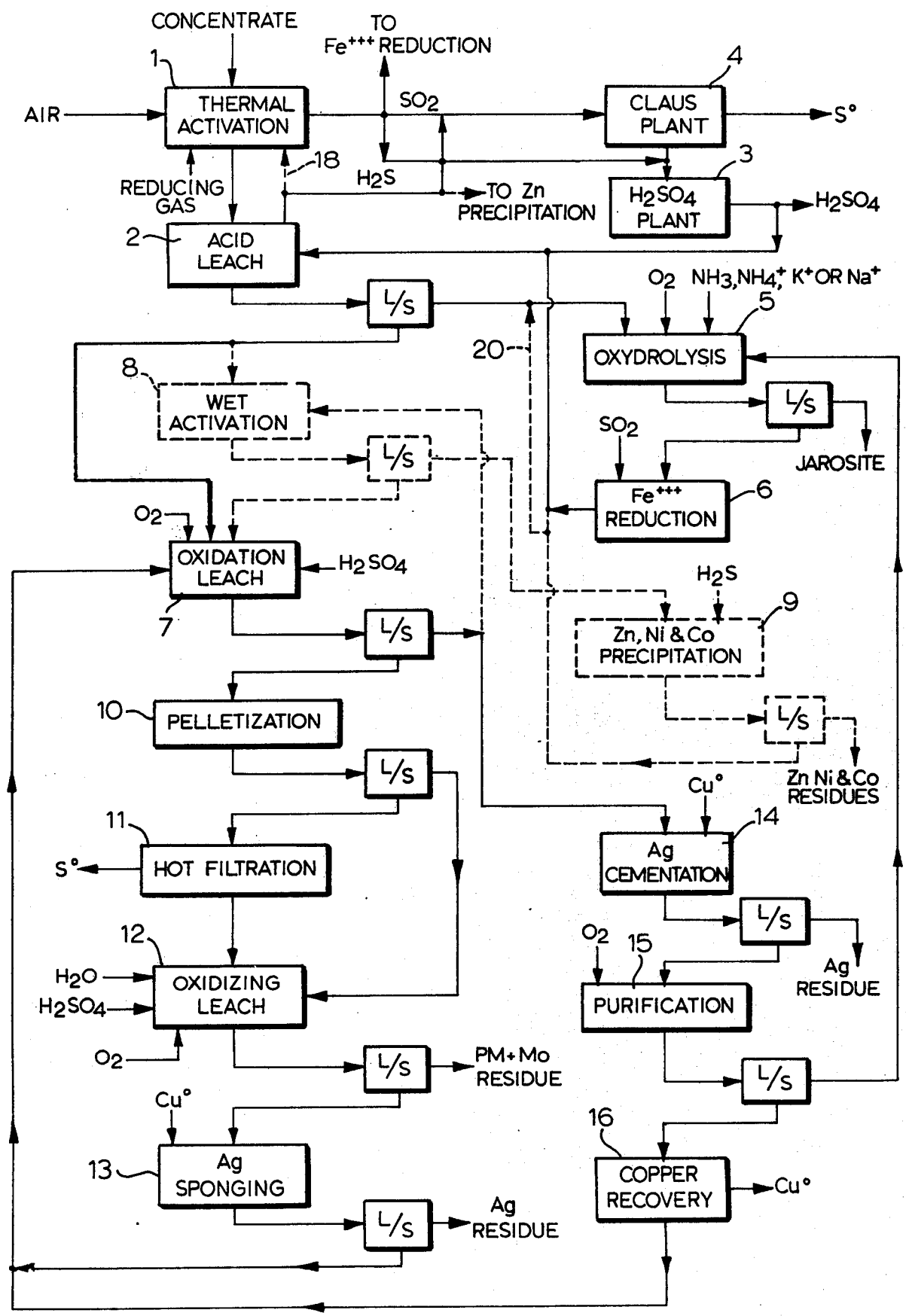

PRODUCTION OF COPPER AND SULFUR FROM COPPER-IRON SULFIDES

BACKGROUND OF THE INVENTION

This invention relates to a hydrometallurgical process for treating iron containing metal sulfides such as pyritic metal sulfides containing non-ferrous metal values for separate recovery of said non-ferrous metal values and sulfur values wherein said sulfur values can be selectively produced as elemental sulfur or in the form of sulfuric acid to supply acid requirements of the process.

Many processes are known for the hydrometallurgical extraction of desired metal values and sulfur from sulfide materials. These hydrometallurgical processes usually comprise the leaching of mineral concentrates at elevated temperatures and pressures in the presence of an oxidant in an acidic medium whereby the non-ferrous metal values can be extracted by dissolution and the sulfur can be removed in elemental form. Serious disadvantages of these known processes are the difficulties of dissolving pyritic copper and iron sulfides and of separating precipitated iron compounds from precious metals and dissolved non-ferrous metals. In most of the known processes, minerals such as chalcopyrite and pyrite are not directly soluble or require such severe leaching conditions that these processes become uneconomical.

Accordingly, it is a principal object of the present invention to provide a hydrometallurgical process for the treatment of pyritic metal sulfides containing pyrite, chalcopyrite, bornite, pyrrhotite and the like whereby the iron and non-ferrous metal values are rendered active for selective extraction and separate recovery.

It is another important object of the present invention to provide a substantially closed and self-supporting hydrometallurgical process for treatment of the aforesaid pyritic sulfides wherein sulfur values can be controllably produced as elemental sulfur or in the form of sulfuric acid to satisfy process acid requirements and to substantially obviate the discharge of sulfur-containing gases to the atmosphere.

A further important object of the invention is the provision of a process which permits selective bulk removal of iron values from pyritic metal sulfides to enable subsequent recovery of non-ferrous metal sulfides in enriched and activated form with attendant economies in operating and capital costs.

Another important object of the present invention is the provision of a process for the treatment of pyritic copper sulfides for the recovery of copper values and precious metals together with metal sulfides such as zinc, cobalt and nickel sulfide and molybdenite.

SUMMARY OF THE INVENTION

Accordingly, the process of the invention may be broadly described as follows. Ores and concentrates of pyritic metal sulfides are thermally activated by sequentially heating and reducing said sulfides in a countercurrent flow of a substantially non-oxidizing gas and a reducing gas respectively in a reactor whereby the reaction products of the reducing gas and sulfides together with liberated labile sulfur are controllably combusted with oxygen to satisfy heat requirements of the thermal activation process and to convert sulfur values to $SO_2$ gas. The major portion of the sulfidic iron present in the sulfides is converted to an acid leachable form and non-ferrous metal values are activated and rendered amenable to an acid oxidation leach. The thus activated sulfides are subjected to an acid leach in aqueous sulfuric acid for production of ferrous sulfate and evolution of $H_2S$ gas which are separated from the solid sulfide residue containing concentrated non-ferrous metal values. The ferrous sulfate is oxidized and hydrolysed to precipitate the iron, which is removed from the system, and to regenerate sulfuric acid which is recycled to the acid leach. At least a portion of the $SO_2$ gas from said heating step and at least a portion of the $H_2S$ from the acid leach are converted to sulfuric acid to satisfy the acid requirements of the process, and remaining $SO_2$ is combined and catalytically reacted with remaining $H_2S$ to produce elemental sulfur.

The solids residue from the acid leach, containing enriched copper and other non-ferrous metal values, can be subjected directly to an acid oxidation leach in aqueous sulfuric acid in which copper values are carried into solution as a pregnant copper sulfate liquor which is purified and is subjected to recovery of copper by electrowinning or hydrogen reduction. Remaining oxidation leach residue can be further processed to yield elemental sulfur and a concentrate containing precious metals and any molybdenum present in the feed sulfides.

Alternatively, the solids residue from the acid leach can be subjected to a wet activation leach with copper sulfate, prior to the acid oxidation leach, for further and selective activation of copper values and for dissolution of iron values and certain non-ferrous metal values, such as zinc, nickel and cobalt, for their subsequent recovery.

BRIEF DESCRIPTION OF THE DRAWING

The process will now be described with reference to the accompanying flowsheet which schematically illustrates the steps thereof.

DESCRIPTION OF THE PREFERRED EMBODIMENT

Ores and concentrates suitable for treatment for recovery of non-ferrous metal values can be low grade pyritic copper sulfides, such as low grade concentrates of bornite, chalcopyrite, and mixtures thereof with pyrrhotite and pyrite, and can contain precious metals and other metal values such as zinc, cobalt, nickel and lead sulfides and molybdenite, as well as small amounts of arsenic, antimony, selenium, tellurium and tin.

Particle size of concentrate has been found to be not critical for successful processing, the normal degree of comminution necessary for beneficiation usually being satisfactory for rapid activation and leaching.

The concentration is fed to the thermal activation step 1 which consists of a two-stage heating and reduction operation preferably carried out in a countercurrent reactor such as, for example, a vertical multiple hearth roaster. The concentrate is fed to a heating zone in the top of the reactor and travels downwardly through the hearths countercurrent to an ascending flow of a hot inert or substantially non-oxidizing gas, to be described hereinbelow, wherein the temperature of the concentrate is raised to a temperature in the range of from about 550°C. to a temperature not exceeding the fusion point of the concentrate, preferably from about 650° to about 800°C. Heating of the copper concentrate to this temperature range results in thermal decomposition of the pyritic sulfides with the liberation of labile sulfur. The reactions may, for example, be expressed as follows:

$$5 CuFeS_2 \rightarrow 5 CuFeS_{1.8} + S° \quad (1)$$

$$FeS_2 \rightarrow FeS_{1.05} + 0.95 S° \quad (2)$$

It is understood that the exact composition, and particularly the sulfur content of the delabilized sulfides, may vary and is dependent on process conditions.

The delabilized sulfides then descend through a reducing zone of the roaster having a countercurrent ascending flow of a reducing gas therein capable of accepting sulfur, such as hydrogen, or a hydrogen containing gas such as, for example, ammonia synthesis gas, reformed natural gas or methane, which reacts with the delabilized sulfides at temperatures within the range of from about 550°C. to a temperature not exceeding the fusion point of the concentrate, preferably from about 650° to 800°C. to form a bornite-pyrrhotite type mixture, as follows:

$$5CuFeS_{1.8} + H_2 \rightarrow Cu_5FeS_4 + 4 FeS + H_2S \quad (3)$$

$$FeS_{1.05} + 0.05 H_2 \rightarrow FeS + 0.05 H_2S \quad (4)$$

The copper iron sulfide formed according to reaction (3) has the approximate empirical formula of bornite but its actual composition resembles a mixture of a bornite type material and ferrous and cuprous sulfide. The pyrrhotite formed according to reactions (3) and (4) is readily acid leachable.

We have found that adequate utilization of the hydrogen in the reduction zone can be achieved by countercurrent contacting of the hydrogen with the delabilized sulfides.

The $H_2S$ produced rises into the aforesaid heating zone for mixture with air or an oxygen containing gas in an amount only sufficient, i.e. a substantially stoichiometric amount of oxygen, for controlled combustion of the $H_2S$, $H_2$ and labile sulfur to form $SO_2$ and $H_2O$ which are discharged from the heating zone, and to supply heat requirements for the heating zone. $H_2S$ from a subsequent acid leach may be introduced if desired as indicated by the broken line 18 in the drawing to the heating zone to supplement heat requirements when processing low-pyrite metal sulfides. In case of excess heat the temperature of the solids may be controlled by injection of water, by removal of combustible gases, such as $H_2$, $H_2S$ and sulfur vapor, or by injecting air at points close to the gas discharge end of the reactor.

It is important that the solids in the heating zone be maintained in a substantially neutral or partially reducing state to prevent the formation of metal oxides.

The atmosphere in the heating and delabilizing zone is maintained only sufficiently oxidizing by the addition of, for example, only enough air or an oxygen containing gas to permit burning of the combustible gases and labile sulfur, and to heat the concentrate to the desired delabilizing and reducing temperatures. The atmosphere in the heating zone is defined as preferably being a substantially neutral or partially reducing atmosphere in relation to the solids being treated and containing less than 5% by volume oxygen.

It is important in the heating and reducing zones that the concentrate not be heated to a temperature at which phenomena such as sintering and bridging may occur. By agglomerating the feed prior to introduction to the thermal activation step, such as for example by pelletizing or briquetting the feed, thermal activation can be carried out at an elevated temperature while minimizing sintering and bridging. We have found that a close temperature control can be achieved and maintained by adding controlled amounts of air at spaced intervals along the length of the heating zone of the reactor. For example, a concentrate temperature of about 700°C. can be established by selectively adding air or other oxygen containing gas along the heating zone such that the gaseous atmosphere is heated to a temperature not exceeding 760°C. Utilization of hydrogen gas and acid solubility of resultant iron values decrease at lower temperatures and thus it is desired to maintain the concentrate temperature, during the thermal activation, as high as possible without occurrence of the above named phenomena. Some of the As, Sb and Se present in the concentrate is volatilized in the thermal activation step.

A typical pelletized copper concentrate, analyzing 23.4% copper, 30.2% iron, 4.8% zinc and 35.0% sulfur, was continuously processed in a multiple hearth roaster by heating of the concentrate in an upper heating zone of the roaster by the controlled combustion of hydrogen and gaseous reaction products described above with air to achieve hearth temperatures ranging from 640° to 735°C. The heated concentrate descended through a hydrogen atmosphere for a total retention time of 30 minutes. Samples of the discharge solids were subjected to acid leaching, to be described below, resulting in iron extractions that increased with higher temperatures, as shown in Table 1.

TABLE 1

| Test | Average Hearth Temperature °C. | Fe Extraction % |
|------|-------------------------------|-----------------|
| 1. | 640 | 56 |
| 2. | 700 | 63 |
| 3. | 705 | 73 |
| 4. | 735 | 83 |

The thermally activated concentrate is fed to an acid leach 2 where it is mixed with a solution containing from about 60 to 300 gpl free sulfuric acid, preferably in an amount of up to about 20% in excess of stoichiometric requirements to convert iron to $FeSO_4$, at a temperature of from about ambient to about 200°C. Preferably the leach is conducted at a temperature of from about 30° to 100°C. at atmospheric pressure, for a time sufficient to leach from about 60 to about 90% iron as $FeSO_4$, as represented by the following general equation:

$$Cu_5FeS_4 + FeS + H_2SO_4 \rightarrow Cu_5FeS_4 + H_2S \quad (5)$$

The free acid content of the final solution drops to about 15 gpl, usually from an initial content of about 130 gpl, before leaching of iron ceases, to produce a solution containing from about 50 to 90 gpl iron as $FeSO_4$. This bulk removal of iron leaves an iron depleted leach residue containing copper and iron in a molar ratio of at least about 1:1, usually in the range of from about 2:1 to 15:1, which is suitable for an acid oxidation leach. Temperature is not critical within the preferred range once the reaction has been initiated, a temperature of about 30° to 40°C. usually being required to start the reaction, with temperatures in excess of 100°C. decreasing the solubility of the FeSO₄.

To control foaming, the reaction can be moderated by slow acid addition or by the use of two-stage countercurrent leaching. If necessary, chemical or mechanical foam breakers may be used. Two-stage countercurrent leaching is also preferred in that iron extraction is enhanced and the FeSO₄ liquor has low acidity which is desirable for the subsequent iron precipitation step. The first stage is conducted in filtrate from the second stage containing from about 60 to about 150 gpl free sulfuric acid and about 60 gpl Fe for a time sufficient to obtain an iron extraction of from about 60 to 70% of the acid leachable iron with iron content in the filtrate of about 80 to 90 gpl and free acid of about 1 to 5 gpl. The solids residue from the first stage is charged to the second stage where it is contacted with sulfuric acid generated in other steps of the process, to be described, containing in excess of 200 gpl free sulfuric acid. The slurry is reacted for a time sufficient to extract the remainder of the acid leachable iron and the filtrate is recycled to the first stage leach.

The filtrate from the first step is fed to an iron removal and acid regeneration step. The residue from the second stage is suitable for a subsequent acid oxidation leach, or if necessary, for a wet activation leaching step prior to the acid oxidation leach to remove additional iron and to provide a copper free solution suitable for the removal of zinc to control zinc build-up in the system.

Samples of roaster discharge solids thermally activated as described above were repulped with water and concentrated sulfuric acid, equivalent to a H₂SO₄ : Fe molar ratio of 1.8:1.0, was added stagewise to simulate two-stage atmospheric leaches extending over a period of 1 hour. Temperature was maintained at about 100°C. Iron extractions up to 81.3% were obtained with copper to iron molar ratios in the residue of about 4:1.

Hydrogen sulfide from the acid leach reaction and SO₂ in the exit gases from the heating zone of the thermal activation are utilized in various steps of the process with excess being converted to elemental sulfur. Portions of the H₂S and SO₂ are fed to an acid plant 3, well known in the art, for the production of sulfuric acid, after combustion of the H₂S, in an amount sufficient to satisfy the acid requirements of the process. Excess H₂S and SO₂ are fed to a Claus plant 4, also well known in the art, for catalytic reaction and production of elemental sulfur which is stable and relatively inert and thus suitable for storage or shipment. Unconverted H₂S from the Claus plant is combusted to SO₂ and fed to the acid plant. A small quantity of SO₂ is used in the reduction of ferric iron, to be described, and small quantities of H₂S may be used in the thermal activation and in the precipitation of zinc, cobalt and nickel, as required.

The acid leach liquor containing from 50 to 90 gpl iron as FeSO₄ and from 5 to 60 gpl free H₂SO₄ is fed to the oxydrolysis step 5 where iron is precipitated from the solution in a one-stage oxidation and hydrolysis operation and sulfuric acid is produced. Preferably iron compounds of the jarosite type are precipitated. Ammonia or a suitable ammonium or alkali-metal compound is added to the leach liquor in an amount of from about 50 to 120%, preferably from about 80 to about 100%, of stoichiometric requirements, together with an oxygen bearing gas which provides an oxygen partial pressure in the range of from about 50 to about 200 psi, preferably about 150 psi. A temperature above about 140°C., preferably in the range of from about 140° to about 230°C., is maintained and the oxydrolysis of iron in the presence of cations such as ammonium, sodium or potassium is permitted to proceed for 30 to about 90 minutes to produce jarosite ([A Fe₃ (SO₄)₂(OH)₆] where A = NH₄ +, Na+ or K+) and a dilute sulfuric acid. The sulfuric acid solution containing some residual iron is recycled to the acid leach step after reduction of ferric iron to the ferrous state with SO₂ in step 6. The reduction is carried out according to well known methods at a temperature of about 70° to 80°C. under atmospheric pressure.

A leach liquor, containing 3.7 gpl copper, 51.3 gpl iron and 23.0 gpl free sulfuric acid, to which had been added 90% of the stoichiometric quantity of NH₄⁺ ion (as NH₄OH) required to form ammonium jarosite, was subjected to oxydrolysis by heating with agitation in a pressure vessel at a temperature maintained at 180°C. under 180 psi of oxygen partial pressure. The mean residence time of solution in the pressure vessel was 42 minutes. The filtrate of the resulting product analyzed 2.5 gpl copper, 3.8 gpl iron, and 36.2 gpl sulfuric acid. The solids analyzed <0.1% copper, 34.7% iron and 13.1% total sulfur.

The thermal activation and acid leach steps, with integrated production of elemental sulfur and sulfuric acid, and oxydrolysis of the FeSO₄ liquor for production of sulfuric acid and removal of the major portion of the iron from the system, form an essentially closed system which can be readily balanced to supply process acid and heat requirements with excess sulfur produced in a stable elemental form without the discharge of noxious fumes and gases to the atmosphere.

The solids residue from the acid leach can be directly fed to an acid oxidation leach 7, or optionally fed to a wet activation leach step 8 shown by broken lines in the drawing, if the acid leach residues contain, beside copper values, significant amounts of zinc, lead, nickel and cobalt values and residual iron values. In leach 8, the total amount of iron which can be selectively removed from the process can be increased significantly, the recovery of precious metals from the leach residue can be facilitated due to iron removal, the copper values are further concentrated, and a control over the build-up of zinc in the process, which is the most common attendant metal, can be exercised by precipitation of dissolved zinc in a subsequent step, as will become apparent as the description proceeds.

In the wet activation leach 8, the solids residue from the acid leach is reacted with an acidic copper sulfate solution for replacement by copper of residual iron and any zinc, lead, nickel and cobalt values present in the said solids residue with production of activated copper sulfides, lead sulfate and a solution of ferrous sulfate and a sulfate of any of said zinc, nickel and cobalt values present. For example, iron in the bornite-like material is replaced by copper from the acid CuSO₄ solution according to the following equation:

$$Cu_5FeS_4 + CuSO_4 \rightarrow 2\ Cu_2S + 2\ CuS + FeSO_4 \qquad (6)$$

Iron is removed from the acid leach residue down to a level of from 2 to 10% Fe in the activated copper sulfides, at a copper utilization corresponding to a Cu (precipitated)/Fe(solubilized) molar ratio of close to unity.

The wet activation leach is conducted at a temperature within the range of from about 140° to 200°C., preferably about 160°C., under autogenous pressure, and at a pH of about 0.5 to 2, with a portion of the acid CuSO₄ solution from the acid oxidation leach step 7. The acid CuSO₄ solution contains from about 20 to 100 gpl Cu, from about 3 to 15 gpl Fe, from about 5 to 35 gpl H₂SO₄, and about 20 gpl Zn.

Ferric iron in the feed solution to the wet activation leach may lead to the formation of elemental sulfur as exemplified by the following equation:

$$Fe_2(SO_4)_3 + CuS \rightarrow CuSO_4 + 2 FeSO_4 + S° \qquad (7)$$

The elemental sulfur reacts further to produce sulfuric acid as exemplified by one of several reactions:

$$S° + 3 Fe_2(SO_4)_3 + 4 H_2O \rightarrow 6 FeSO_4 + 4 H_2SO_4 \qquad (8)$$

The copper sulfate formed according to (7) must be subsequently recovered and the sulfuric acid generated according to (8) undesirably adds to the acidity of the system. The amount of ferric iron fed to the wet activation leach therefore should be kept to a minimum to avoid both the dissolution of copper and the production of excess acid.

The reactions involving Zn-, Pb-, Ni- and Co-sulfides also occur as follows:

$$MeS + CuSO_4 \rightarrow CuS + MeSO_4 \qquad (9)$$

where Me = Zn, Pb, Co, or Ni. These reactions, which consume an amount of CuSO₄ dependent on the amount of these sulfides present, provide an effective means for dissolution and subsequent recovery or removal of Zn, Co and Ni from the system while Pb precipitates as its sulfate. For example, copper concentrates often contain sphalerite which is at least partly leached in the wet activation leach 8.

Solids residue from the preceding acid leach was mixed with an acidic copper sulfate solution containing 70 gpl copper as copper sulfate and agitated in a closed vessel for 1 hour at a temperature of 160°C. The amount of copper provided in solution was equivalent to a copper to iron molar ratio of 1.04:1, or copper to iron + zinc molar ratio of 0.85:1. The solids product separated from the solution analysed 55.7% copper, 7.15% iron, 2.58% zinc and 23.9% total sulfur; indicating iron and zinc extractions from the solids residue of 54.7% and 39.9% respectively. The combined iron extraction in the acid and the wet activation leaches was 87.2% and the combined zinc extraction from these leaches was 70%.

The solution from the wet activation leach 8 is a substantially copper-free FeSO₄ liquor which is subsequently stripped of zinc in zinc precipitation 9 wherein a partial pressure of H₂S of from about 30 to about 100 psi, preferably about 100 psi, at a temperature of from ambient to about 100°C., is maintained to precipitate the zinc as a concentrate of ZnS. Zinc removal from solution decreases with increasing acidity. A temperature of about 70°C., a normal operating temperature, and acidities provided by free acid contents in the range of from about 20 to 40 gpl sulfuric acid, are acceptable for zinc removal. The remaining acid FeSO₄ liquor, containing less than about 2 gpl Zn, is returned to the acid leach to pick up more iron as FeSO₄, or alternatively is fed to oxydrolysis 5 for removal of iron, as indicated by the broken line 20 in the drawing. Cobalt and nickel in the solution from the wet activation leach 8 do not precipitate with H₂S under the conditions maintained in zinc precipitation 9, hence, substantially complete separation is possible. If desired, nickel and cobalt can be precipitated from the residual solution from the zinc precipitation by raising the temperature of the solution to as high as 150°C., preferably in the range of from about 100° to 150°C., and maintaining a partial pressure of H₂S of about 100 psi. A concentrate of cobalt and nickel sulfide is recovered for further processing.

The operation of the zinc precipitation was typified by treating a representative solution from the wet activation leach, containing 0.019 gpl copper, 41.3 gpl iron, 13 gpl zinc and 58 gpl sulfuric acid, by agitation in a pressure vessel for 30 minutes at 70°C. under 100 psi pressure of H₂S gas for precipitation of zinc sulfide. The resulting slurry was filtered to yield a filtrate which contained 1.1 gpl zinc. The solids analyzed 60.8% zinc, 32.4% sulfur, 0.15% copper and 0.15% iron.

The activated copper sulfides from the wet activation leach 8, or the solids residue from acid leach 2, is fed to a single or multi-stage acid oxidation leach 7 and leached with return acid from copper recovery 16 according to the following equation:

$$Cu_xFe_yS_z + (x+y)H_2SO_4 + (\frac{x+y}{2}) O_2$$
$$xCuSO_4 + yFeSO_4 + (x+y)H_2O + zS° \qquad (10)$$

in which x, y and z have values in combinations covering various copper sulfides and copper-iron sulfides. For example, for Cu₂S, x has the value 2, y has the value 0 and z has the value 1. Under oxidizing conditions the ferrous sulfate usually is at least partially oxidized to ferric sulfate. The main reaction taking place in the oxidizing leach is the dissolution of copper as cupric ion and the oxidation of sulfide sulfur to elemental sulfur. Sulfides such as those of silver and molybdenum are relatively unreactive and, together with precious metals, substantially remain as solids in the leach residue together with the gangue materials and elemental sulfur. Zinc and lead sulfides will react similarly to the copper to form ZnSO₄ and PbSO₄. The acid for this leach is return acid from a subsequent copper recovery step containing from about 40 to 200 gpl H₂SO₄, from about 0 to 40 gpl cupric ions and from about 0 to 10 gpl ferrous ion. The composition of the return acid will depend largely on the method of copper recovery used. If, for example, hydrogen reduction is employed, the return acid may contain from about 80 to 120 gpl H₂SO₄, from about 10 to 25 gpl copper as cupric ions and from about 1 to 5 gpl iron as ferrous ions.

To achieve high rates of reaction, the temperature should be controlled just below the melting point of elemental sulfur. The upper limiting temperature thus is that temperature at which the elemental sulfur melts, i.e. 113° to 119°C., causing occlusion of unreacted sulfides and thereby inhibiting the leaching reaction. We have found in two-stage countercurrent oxidation leaching that by maintaining the temperature in a first stage leach in the lowere end of the range, i.e., within the range of from about 70° to 100°C., the blinding of particle surfaces is effectively prevented, while the temperature in the second stage of the leach may be maintained in the higher end of the range, i.e., within the range of from about 105° to about 110°C.

The oxidation leach can be performed under a wide range of pressures. We have found that in the presence of an oxygen bearing gas the pressure in the oxidation leach may be up to about 400 psi partial pressure of oxygen to provide satisfactory extractions. Pressures above 400 psi improve the leaching rates marginally and do not justify the additional capital costs for higher pressure equipment. Thus, it is possible to conduct the oxidation leach with an oxygen bearing gas providing a partial pressure of oxygen in the range of from about atmospheric to about 400 psi, preferably at about 200 psi. An effective oxidation leach can be obtained by maintaining the pressure in a first stage of the oxidation leach in the lower end of the above stated pressure range at from substantially atmospheric to about 300 psi, and to maintain the pressure in the second stage in the higher end of the range of from about 100 to about 400 psi.

The oxygen bearing gas can be air, oxygen, or mixtures thereof, preferably oxygen. We have found that a substantial portion of the copper sulfides such as $Cu_2S$, $CuS$ and $Cu_5FeS_4$ will be extracted in the presence of the oxygen bearing gas in the first stage oxidation leach while remaining copper sulfides will be extracted in the second stage leach.

The retention time of the reaction mixture in each of the stages of the oxidation leach may vary within a broad range and is dependent not only on the required extraction in each stage but also on the conditions in each stage. Thus we have found that at higher temperatures and pressures the retention time may be between 10 minutes to 30 minutes while at lower temperature and pressures the rentention time may very between 1 hour and 12 hours.

The acidity of the reaction mixture in the oxidation leach is critical and must be carefully controlled to ensure a high dissolution of the copper as well as to prevent the precipitation of iron compounds and associated loss of silver and molybdenum. If the pH of the reaction mixture rises too high, the iron in the solution will hydrolyse and precipitate, and valuable silver and molybdenum which are present in the reaction mixture will be occluded by this precipitate and will leave the process in the tailings from the subsequent flotation step. The acidity is controlled by the addition of return acid, or sulfuric acid from the acid plant, to prevent the precipitation of iron.

An oxidation leach was conducted as follows. Solids residue from the preceding wet activation leach containing 53.4% copper, 11.6% iron, 2.14% zinc and 24.8% total sulfur were repulped with an electrolyte containing excess sulfuric acid such that the sulfuric acid to copper + zinc + iron molar ratio was 1.05. The slurry was agitated in a pressure vessel with an oxygen partial pressure of 200 psi at a temperature initially maintained at 95°C. and raised to 110°C. during the latter portion of the acid oxidation leach. Table 2 indicates analyses of the solid and liquid constitutents of samples taken at 1 hour intervals from the commencement of feed.

TABLE 2

| Time (Hrs.) | Filtrate (gpl) | | | | Residues (%) | | | S° | Extractions (%) | | |
|---|---|---|---|---|---|---|---|---|---|---|---|
| | Cu | Zn | Fe | $H_2SO_4$ | Cu | Zn | Fe | | Cu | Zn | Fe |
| Feed | 20 | 20 | 5 | 145 | 53.4 | 2.14 | 11.6 | 24.8 | | | |
| 1 | 75.4 | 21.4 | 10.1 | 43.8 | 5.61 | 1.69 | 9.6 | 37.8 | 95.6 | 67.0 | 65.3 |
| 2 | 80.8 | 22.4 | 15.6 | 24.0 | 2.23 | 0.73 | 3.9 | 61.5 | 98.6 | 88.3 | 88.4 |
| 3 | 83.4 | 23.4 | 18.3 | 16.0 | 0.99 | 0.17 | 1.0 | 70.3 | 99.4 | 97.5 | 97.2 |
| 4 | 82.0 | 22.8 | 18.0 | 13.9 | 0.79 | 0.08 | 0.7 | 67.3 | 99.5 | 98.8 | 97.9 |

The solids in the discharge slurry from the oxidation leach, containing elemental sulfur, unreacted sulfides, lead sulfate, molybdenum and precious metals, are separated from the leach copper liquor and are treated for recovery of these values. Dependent on the quantity of gangue materials in the discharge slurry, the slurry may be subjected, if desired, to flotation (not shown) to separate the insoluble gangue material from a concentrate which is treated for recovery of the above named values.

The discharge slurry, or the concentrate from flotation, is subjected to a pelletization step 10. Pelletizing of the elemental sulfur is effected by heating the slurry to about 125°C. under constant agitation for a time sufficient to permit the elemental sulfur to melt and coalesce and then cooling to about 90°C. for a time to enable the pellets to solidify. These pellets are separated by standard techniques. For instance the resulting slurry is screened on a 35 mesh Tyler screen and the +35 mesh pellets washed to remove slimes. The −35 mesh pellets and slimes are subjected to centrifugal separation in a hydrocyclone. The +35 mesh pellets and hydrocyclone underflow are heated to from 120° to 140°C. and subjected to hot filtration 11 at a pressure of about 20 psig air pressure to produce an elemental sulfur product, which comprises from 80 to 95% of the sulfur present in the discharge slurry from the oxidation leach.

The slimes and filtercake from filtration 11, consisting of a small amount of unreacted copper sulfides, hydrolysed iorn, sulfur and gangue minerals, together with precious metals, tin, lead sulfate and molybdenum, can be processed for further metal recovery by several techniques. For example, the slurry can be subjected to an oxidizing acid leach 12 at a temperature in the range of from about 200° to 250°C. and an oxygen partial pressure in the range of from about 150 to 250 psi to dissolve copper values as $CuSO_4$ and iron as $FeSO_4$, in which the latter oxidizes and hydrolyses to basic ferric sulfates or hydrated oxides. These iron products can be redissolved, if desired, at 90°C. with an $SO_2$ treatment (not shown) leaving a final residue containing precious metals, tin, lead sulfate and molybdenum. Any silver that is solubilized can be recovered by cementation with copper powder in a silver sponging step 13. The remaining liquor containing copper and iron values and sulfuric acid, together with residual acid from the subsequent copper recovery, to be described, is recycled to the oxidation leach 7.

The pregnant copper liquor from the acid oxidation leach 7, containing about 60 to 100 gpl copper, about 5 to 25 gpl sulfuric acid and about 3 to 15 gpl ferric ion, is purified by a two-stage process, preparatory to recovery of copper values, by removal of major portions of silver, selenium, tellurium, arsenic, antimony, tin and iron. Silver is first precipitated from the pregnant liquor by the addition of copper powder in silver cementation 14. Copper powder is added in an amount of about 10% in excess of stoichiometric requirements to reduce ferric iron to ferrous iron and at a temperature in the range of from about ambient to about 100°C., preferably from 60° to 70°C., whereby the silver content is reduced to less than 5 mgpl, some selenium is removed, and the iron is reduced to the ferrous state. The liquor is treated in purification 15 by heating to from about 150° to 250°C., preferably to about 200°C., under an oxygen partial pressure of from about 20 to about 200 psi, preferably about 150 psi, to precipitate iron as ferric oxide and basic sulfate and to remove most arsenic, antimony, tellurium and selenium. It is important that the pregnant liquor does not contain more than 10 gpl free acid, corresponding to a pH of about 1–2. Any excess free acid therefore is neutralized with CaO which can be injected directly into the purification reactor.

The two-stage purification is exemplified by the following example. Solution from the oxidation leach, containing 69 gpl copper, 4.9 gpl iron (1.2 gpl $Fe^{+++}$ and 3.7 gpl $Fe^{++}$), 21.4 gpl sulfuric acid, 1.0 mgpl silver and 0.38 mgpl selenium, was mixed with 6 gpl copper dust, stirred in the absence of air for 20 minutes at 60° to 70°C., and then filtered through a bed of copper powder. The filtrate analyzed 67 gpl copper, 4.4 gpl iron (0.1 gpl $Fe^{+++}$ and 4.3 gpl $Fe^{++}$), 19 gpl sulfuric acid, 0.2 mgpl silver and 0.25 mgpl selenium. The substantially silver-free solution was further processed by first neutralizing the sulfuric acid to 10 gpl by the addition of lime, filtered, and then agitated in a pressure vessel at a temperature maintained at 200°C. under a partial pressure of oxygen of 150 psi for a retention time of 35 minutes. The resulting slurry was filtered to yield a solids residue which contained 2.1% copper, 52.6% iron and 4.6% total sulfur. The filtrate analysed 66 gpl copper, 0.5 gpl iron, 17.6 gpl sulfuric acid, 0.3 mgpl silver and 0.12 mgpl selenium. The filtrate substantially free of iron, silver and selenium, was suitable for subsequent copper recovery.

The iron oxide slurry is thickened, filtered, washed free of copper and fed to oxydrolysis step 5. The pregnant liquor, essentially a pure $CuSO_4$ solution containing less than 1 gpl iron, can be fed to copper recovery 16 for recovery of metallic copper by electrowinning or by hydrogen reduction.

Pure copper cathodes can be recovered from the purified $CuSO_4$ pregnant liquor in a standard electrowinning tank house. The copper containing liquor is diluted with a recycle of spent electrolyte for a cell liquor feed containing about 45 gpl Cu and 100 gpl $H_2SO_4$ and fed to electrolytic cells for production of cathodes at a current density in the range of from about 180 to 400 amperes per square meter and a cell discharge liquor of 20 gpl Cu and about 140 gpl $H_2SO_4$. Spent electrolyte is recycled to the oxidation leach step 7.

Alternatively, copper can be won from the $CuSO_4$ pregnant solution by hydrogen reduction. We have found that a direct reduction with hydrogen gas at elevated temperature and pressure in a continuous fashion is very rapid. The reaction is carried out on a continuous basis in a suitable reaction vessel with agitation at a temperature of about 130° to 200°C. under a hydrogen partial pressure of about 300 to 400 psi. The retention time required for the reduction of copper from about 80 gpl to the target residual amount of 20 gpl is not more than about 30 minutes. Residual solution is recycled to the oxidation leach step 7.

What we claim as new and desire to protect by Letters Patent of the United States is:

1. A process for treating metal sulfides containing iron and non-ferrous metals including copper for bulk removal of the iron content therefrom and for rendering copper and other non-ferrous metal values amenable for separate recovery, which comprises the steps of: heating said metal sulfides in a heating zone to an elevated temperature in a substantially non-oxidizing atmosphere for removal of labile sulfur; contacting said delabilized sulfides in a reducing zone with a reducing gas capable of accepting sulfur to convert sulfidic iron in said sulfides to an acid leachable form, said reducing gas countercurrently contacting said delabilized sulfides; controllably burning combustible reaction products and labile sulfur therefrom with sufficient oxygen to provide heat for said heating step and to convert sulfur values to $SO_2$ for discharge from the said heating step; subjecting said sulfides to an acid leach in aqueous sulfuric acid to produce a solution of ferrous sulfate and a solids residue containing copper and iron in a molar ratio of at least about 1:1 with concurrent evolution of $H_2S$ gas; discharging said ferrous sulfate and solids residue for subsequent separation, recovery of non-ferrous metal values and for production of sulfuric acid for recycle to said acid leach; combusting a portion of said $H_2S$ gas; combining the combusted $H_2S$ with $SO_2$ from said heating step for the production of at least a portion of the sulfuric acid required in said acid leach; combining remaining $H_2S$ with remaining $SO_2$ from said heating step for the production of elemental sulfur, and controlling said production of sulfuric acid and elemental sulfur to supply acid requirements for the acid leach step and to produce excess sulfur as elemental sulfur.

2. A process as claimed in claim 1 in which said reducing gas is hydrogen, adding a substantially stoichiometric amount of oxygen to said heating zone for controlled combustion of hydrogen, $H_2S$ and labile sulfur to supply heat requirements for the heating step and to convert $H_2S$ and labile sulfur to $SO_2$.

3. A process as claimed in claim 1, adding $H_2S$ from the acid leach to the heating zone to supplement heat requirements in the heating zone.

4. A process as claimed in claim 2 in which said oxygen is contained in air added at spaced intervals along the heating zone and in controlled amounts whereby combustion of hydrogen, $H_2S$ and labile sulfur is controlled to provide the desired temperature in the sulfides and in the heating zone, said temperature not exceeding the fusion point of said sulfides.

5. A process as claimed in claim 4, in which the maximum temperature of the sulfides is about 700°C. and the maximum temperature of the atmosphere in the heating zone is not more than about 760°C.

6. A process as claimed in claim 1 in which said substantially non-oxidizing atmosphere is a neutral or partially reducing atmosphere containing less than 5% by volume oxygen.

7. A process as claimed in claim 1, heating and reducing said metal sulfides sequentially in a vertical multiple hearth roaster as the said sulfides descend through heating and reducing zones in contact with a counter-current flow of a substantially non-oxidizing gas and hydrogen gas respectively.

8. A process as claimed in claim 1, agglomerating the metal sulfides prior to heating said sulfides to an elevated temperature for removal of labile sulfur.

9. A process as claimed in claim 1 in which the heating and reducing steps are conducted at a temperature within the range of from about 550°C. to the fusion point of the metal sulfides.

10. A process as claimed in claim 1 in which the heating and reducing steps are conducted at a temperature within the range of from about 650° to about 800°C.

11. A process as claimed in claim 1, in which the solids residue from the acid leach contains copper and iron in a molar ratio in the range of from about 2:1 to about 15:1.

12. A process as claimed in claim 1 in which the sulfuric acid in the acid leach is present in amount up to about 20 percent in excess of stoichiometric requirements to convert iron to $FeSO_4$.

13. A process as claimed in claim 12 in which the acid leach is conducted at a temperature of from about 30° to about 100°C.

14. A process as claimed in claim 13 in which the acid leach is conducted as a two-stage countercurrent leach and ferrous iron in the filtrate from the first stage is oxidized and hydrolysed in the presence of ammonia or ammonium or alkali metal-compounds for the precipitation of jarosite and production of sulfuric acid.

15. A process as claimed in claim 14, reducing any ferric iron in said sulfuric acid to ferrous iron with $SO_2$ and recycling said sulfuric acid to the acid leach.

16. A process as claimed in claim 1, reacting the solids residue from the acid leach with an acidic copper sulfate solution for replacement of residual iron and any zinc, lead, nickel and cobalt values present in the said solids residue by copper for the production of acitivated copper sulfides, lead sulfate and a solution of ferrous sulfate and a sulfate of any of said zinc, nickel and cobalt values present.

17. A process as claimed in claim 1, subjecting the solids residue from the acid leach to an acid oxidation leach in an aqueous solution of sulfuric acid for oxidation of sulfide sulfur to elemental sulfur and for solution of copper as cupric ion to form a copper sulfate solution.

18. A process as claimed in claim 17, said oxidation leach being a multiple stage oxidation leach wherein the oxygen partial pressure in the first stage is maintained at a pressure of up to about 300 psi at a temperature within the range of from about 70° to 100°C. and in the last stage is maintained at a pressure of from about 100 to 400 psi at a temperature within the range of from about 105° to 110°C., and controlling the acidity of the aqueous solution to avoid hydrolysis and precipitation of contained iron.

19. A process as claimed in claim 17, for recovery of zinc values in the solids residue from the acid leach prior to said acid oxidation, contacting a portion of the copper sulfate solution from the acid oxidation with the said solids residue for precipitation of copper values as copper sulfides and lead values as lead sulfate and forming of a $FeSO_4$ liquor containing said zinc values, reacting the $FeSO_4$ liquor with $H_2S$ for precipitation and recovery of zinc values therefrom as zinc sulfide and generation of sulfuric acid and recycling resulting acid sulfate liquor to the acid leach.

20. A process as claimed in claim 19, reacting said $FeSO_4$ liquor with $H_2S$ at a temperature of from ambient temperature to 100°C. with a partial pressure of $H_2S$ of from about 30 to about 100 psi.

21. A process as claimed in claim 17, for recovery of zinc, lead, nickel and cobalt values in the solids residue from the acid leach prior to acid oxidation, contacting a portion of the copper sulfate solution from the acid oxidation with the said solids residue for precipitation of copper values as copper sulfides and lead values as lead sulfate and forming of a $FeSO_4$ liquor containing said zinc, nickel and cobalt values, reacting the $FeSO_4$ liquor with $H_2S$ for precipitation and recovery of zinc, cobalt and nickel values therefrom as zinc, cobalt and nickel sulfides and generation of sulfuric acid, and recycling resulting acid sulfate liquor to the acid leach.

22. A process as claimed in claim 21, reacting said $FeSO_4$ liquor with $H_2S$ at a partial pressure of $H_2S$ of from 30 to about 100 psi at a temperature of from ambient temperature to 100°C. for precipitation and recovery of zinc sulfide from the liquor and for generation of sulfuric acid; and increasing said temperature to from about 100° to 150°C. for precipitation and recovery of nickel and cobalt sulfides and generation of sulfuric acid, and recycling resulting acid sulfate liquor to the acid leach.

23. A process as claimed in claim 17, heating said elemental sulfur and copper sulfate solution to about 125°C., agitating said solution for coalescence of the sulfur, cooling said solution and elemental sulfur to about 90°C. for solidification of sulfur as pellets, and filtering said pellets at a temperature within the range of from about 120° to 140°C. to produce an elemental sulfur product and a filtercake.

24. A process as claimed in claim 23, subjecting the leach filtercake containing copper and iron values, precious metals and molybdenum to an oxidizing acid leach at a temperature in the range of from about 200° to 250°C. and an oxygen partial pressure in the range of from about 150 to 250 psi for dissolution of copper and iron values in an acid liquor as copper and iron sulfates, separating said precious metals and molybdenum from said liquor as a residue, cementing solubilized silver with copper powder and separating said cemented silver from the liquor, and recycling the resulting acid liquor to the oxidation leach.

25. A process as claimed in claim 17, purifying said copper sulfate liquor for substantial removal of any contained silver, selenium, tellurium, arsenic, tin, antimony and iron therefrom comprising adding copper powder, in an amount about 10% in excess of that stoichiometrically required to reduce any ferric iron to ferrous iron, to said solution at a temperature of from ambient temperature to about 100°C. whereby the silver is reduced to less than 5 mgpl, iron is reduced to the ferrous state, and a portion of selenium is removed, adjusting the liquor pH to about 1 to 2, and heating said liquor to a temperature in the range of from about 150° to about 250°C. under an oxygen partial pressure of from about 20 to 200 psi whereby iron is precipitated and most arsenic, molybdenum, tellurium and selenium is removed.

26. A process as claimed in claim 17, recovering metallic copper from said copper sulfate solution by electrowinning comprising adjusting the solution to about 45 gpl Cu and about 100 gpl $H_2SO_4$, electrolysing said adjusted solution at a current density in the range of from about 180 to 400 amperes per square meter for production of copper cathodes, and recycling residual solution to the oxidation leach.

27. A process as claimed in claim 17, recovering metallic copper from said copper sulfate solution by hydrogen reduction comprising reacting the solution containing about 80 gpl Cu with hydrogen gas at a temperature within the range of from about 130° to 200°C. at a hydrogen partial pressure of from about 300 to about 400 psi for production of metallic copper, and recycling residual solution to the oxidation leach.

28. A process for treating iron and copper containing metal sulfides which comprises the steps of:
1. heating said sulfides in a substantially non-oxidizing atmosphere for substantial removal of labile sulfur and reducing said delabilized sulfides by contacting with a countercurrent flow of a reducing gas capable of accepting sulfur to convert sulfidic iron in said sulfides to an acid-leachable form, said heating and reducing steps being conducted at a temperature within the range of from about 550°C. to about the fusion point of the metal sulfides;
2. combusting gaseous reaction products from the reducing step to provide heat for the heating step and to convert sulfur values to $SO_2$;
3. subjecting said sulfides to an acid leach in a solution containing sulfuric acid at a temperature of at least about ambient temperature to produce a solution of ferrous sulfate, $H_2S$ gas and a solids residue containing copper and iron in a molar ratio of at least about 1:1;
4. combining a portion of said $H_2S$ gas with $SO_2$ gas from the heating step and converting said combined gases to produce at least a portion of the sulfuric acid required in the acid leach and combining remaining $H_2S$ with remaining $SO_2$ from the heating step for the production of elemental sulfur;
5. separating the solution of ferrous sulfate from the solids residue and oxidizing and hydrolyzing the ferrous sulfate for the precipitation of iron compounds and the regeneration of sulphuric acid;
6. separating the precipitated iron compounds from the regenerated sulfuric acid and recycling the said sulfuric acid to the acid leach;
7. subjecting the solids residue from the acid leach to an acid oxidation leach in an aqueous solution of sulfuric acid for oxidation of sulfide sulfur to elemental sulfur and for solution of copper as cupric ion to form a copper sulfate solution;
8. separating the copper sulfate solution from the elemental sulfur for recovery of elemental sulfur;
9. recovering metallic copper from the copper sulfate solution with concurrent generation of sulfuric acid; and
10. recycling said sulfuric acid to the acid oxidation leach.

* * * * *